United States Patent [19]

Brunstetter

[11] 3,847,193
[45] Nov. 12, 1974

[54] NAIL-SCREW HOLDER
[75] Inventor: Frank H. Brunstetter, San Antonio, Tex.
[73] Assignee: Hi-Tor Inventions Corporation, San Antonio, Tex.
[22] Filed: June 29, 1973
[21] Appl. No.: 374,986

[52] U.S. Cl.................. 145/46, 145/50 D, 227/147
[51] Int. Cl............................................. B25c 3/00
[58] Field of Search............ 145/46, 50 D, 50 F, 51, 145/52; 227/147

[56] References Cited
UNITED STATES PATENTS

| | | | |
|---|---|---|---|
| 1,440,072 | 12/1922 | Greener | 145/46 |
| 1,575,582 | 3/1926 | Joy | 145/46 X |
| 2,929,067 | 3/1960 | Tupta | 145/46 |
| 2,985,208 | 5/1961 | Hibbard et al. | 145/50 D |

Primary Examiner—Al Lawrence Smith
Assistant Examiner—J. T. Zatarga

[57] ABSTRACT

A device for releasably holding a nail or the like during a nail-driving operation has an elongated rigid shank with a forward extension adapted to releasably retain the nail in axial alignment with the shank. The forward extension is made of a resilient material having limited flexibility and has a self-closing opening in the leading end thereof through which the head of the nail can be inserted to be retained in engagement with the leading end of the shank. The leading end of the shank has a concave face to retain desired alignment between the shank and the nail and a relatively small depression is provided in the concave face to receive small sized nail heads for maintenance of proper alignment.

8 Claims, 6 Drawing Figures

PATENTED NOV 12 1974 3,847,193
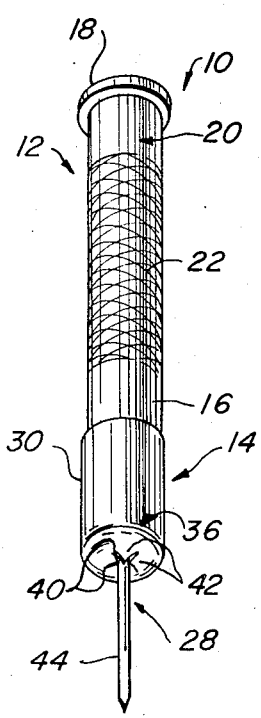
Fig_1
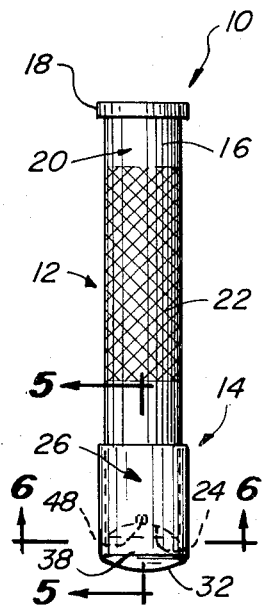
Fig_2
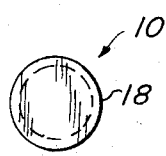
Fig_3
Fig_4
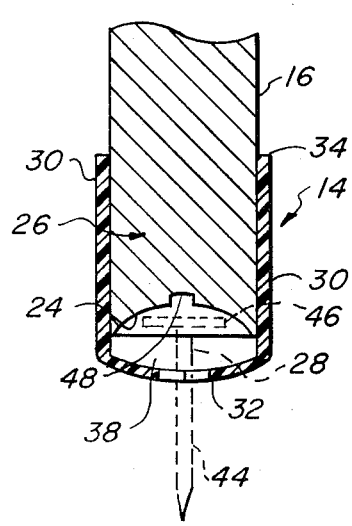
Fig_5
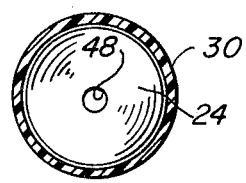
Fig_6

NAIL-SCREW HOLDER

BACKGROUND OF THE INVENTION

The present invention relates to hand tools, and more particularly relates to a device for releasably retaining the head of a fastener, such as a nail, screw or the like so as to accurately position and align the nail as it is driven into a workpiece without necessity of manually grasping the shank portion of the fastener.

The frustrations encountered in driving relatively short fasteners, such as nails, screws or the like have resulted in the development of devices to hold the fastener in a manner so as to increase the effective length of the fastener so it can be more reliably handled during a driving operation. These devices are typically characterized by magnetic means or clamping arms to releasably retain the nail, screw or the like and, therefore, are unnecessarily expensive to manufacture.

SUMMARY OF THE INVENTION

It is an object of the present invention to provide a simplified device for releasably retaining nails, screws or other like fasteners during driving operations which facilitates handling of short-length fasteners and is inexpensive to manufacture.

It is another object of the present invention to provide a holder for nails, screws or the like that includes a tool engaging portion with a resilient forward extension of limited flexibility and wherein the forward extension has a self-closing opening adapted to allow the head of a nail or the like to be inserted therethrough and retained in engagement with the leading end of the shank so that the shank defines an effective elongation of the nail to facilitate handling of the nail during driving operations.

It is another object of the present invention to provide a holder for releasably retaining nails, screws or the like during driving operations which has an elongated shank portion with a sleeve-type extension from the leading end thereof and wherein the sleeve-type extension has a self-closing opening in its leading end which is spaced from the leading end of the shank whereby the head of a nail can be inserted through the self-closing opening and releasably retained between the leading end of the shank and the leading end of the extension to facilitate handling of the nail during driving operations.

It is another object of the present invention to provide a holder for releasably retaining nails, screws or the like during driving operations which has a shank member with a forward extension from the leading end of the shank adapted to retain the head of a nail in engagement with the leading end of the shank and wherein the leading end of the shank has a concave face to maintain desired alignment of the shank with the nail.

It is still another object of the present invention to provide a device for releasably holding nails, screws and the like during driving operations which has an elongated rigid shank with an extension from the leading end thereof adapted to releasably retain the head of a nail in engagement with the leading end of the shank and wherein the leading end of the shank has a concave face with a centrally located indentation therein whereby small-sized nail heads can be seated in the indentation to maintain desired alignment between the nail and the shank.

These and other objects of the present invention are attained with a simple, easy-to-handle device which is inexpensive to manufacture and reliably retains nails, screws or other like fasteners in axial engaged alignment with the device so as to effectively elongate the fastener to facilitate handling thereof.

More particularly, the device of the present invention has a tool engaging portion of a rigid hardened material sufficient to withstand repeated impact from a hammer or other driving tool and a resilient forward extension of limited flexibility having a self-closing opening in the leading end thereof through which the head of a fastener can be inserted for releasable retention in engagement with the leading end of the tool engaging portion. Preferably, the forward extension is made of a rubber-like material and the self-closing opening is defined by criss-crossed slots in the leading end of the extension so that when the head of the fastener is inserted into the slotted opening, the leading end of the extension will flex inwardly to allow insertion of the head and will return to the closed position in gripping engagement with the sides of the fastener. The leading end of the tool engaging portion preferably has a concave, forwardly directed face to seat the head of the nail and maintain axial alignment of the nail with the tool engaging portion. If desired, an indentation may be provided in the concave face to seat the head of fasteners having relatively small heads, such as finishing nails or the like. Accordingly, it will be appreciated that the device is simply constructed and easy to use while being of a nature such that it is relatively inexpensive to manufacture.

BRIEF DESCRIPTION OF THE DRAWING

Other objects, advantages and capabilities of the present invention will become more apparent as the description proceeds taken in conjunction with the accompanying drawings, in which:

FIG. 1 is a perspective view of the device of the present invention with a nail releasably retained thereby, FIG. 2 is a side elevation of the device of FIG. 1 with the nail removed, FIG. 3 is a top plan view of the device as shown in FIG. 2, FIG. 4 is a bottom plan view of the device as shown in FIG. 2, FIG. 5 is an enlarged fragmentary section taken along line 5—5 of FIG. 2, and FIG. 6 is an enlarged section taken along line 6—6 of FIG. 2.

DESCRIPTION OF THE PREFERRED EMBODIMENTS

The nail holding device 10 of the present invention is best seen in FIGS. 1 and 2 to have a shank or tool engaging portion 12 and an extension or fastener receiving portion 14. The shank portion 12 comprises a solid elongated cylindrical rod 16 of a rigid hardened material, such as finished steel, having an enlarged diameter flattened head 18 at its trailing end 20, a knurled surface 22 along an intermediate portion thereof and a concave forward face 24 at the leading end 26. The enlarged diameter flattened head 18 at the trailing end 20 of the shank 12 is adapted to be impacted by a driving tool such as a hammer or the like while the knurled intermediate surface 22 of the shank makes the device easy to grip and handle. As will be more clear with the description of the forward extension portion 14 hereinafter, the concave face 24 at the leading end 26 of the shank 12 is adapted to seat the head of a nail, screw or other like fastener 28 to maintain desired axial alignment of the fastener with the shank portion 12 of the device.

The forward extension portion 14 is preferably made of a resilient rubber-like material with limited flexibility and includes a tubular sleeve-type body 30 with a forwardly convex leading end in the form of a flexible cap or membrane 32. The open trailing end 34 of the body 30 receives the leading end 26 of the shank 12 so that the leading end 32 of the extension portion 14 is spaced from the leading end 26 of the shank portion defining a nail head retention pocket 38. As will be appreciated, the rearwardly directed face of the leading end 32 of the extension member 14 is concave to cooperate with the concave forwardly directed face 24 of the shank in defining a substantially oval-shaped cross-sectional configuration for the nail head retention pocket 38.

As best seen in FIGS. 1 and 4, the leading end 32 of the extension portion 14 has a pair of centrally located slots 40 therethrough which are criss-crossed in perpendicular relationship with each other. The slots 40 define therebetween circumferentially spaced flaps 42 on the leading end 32 of the extension portion 14 which will flex inwardly or outwardly to allow insertion or removal respectively of a nail head and which, due to the resiliency thereof, will return automatically to the closed position after the relatively large head has passed through the opening defined by the slots. It will accordingly be appreciated that the opening in the leading end 32 of the extension member 14 is self-closing whereby once the head of a nail has been inserted through the opening, the flaps 42 will return to their normal closed position and grippingly engage the elongated body or shank portion 44 of the nail or other fastener 28 so as to hold the nail in a desired position relative to the shank 12. In other words, the flexible flaps 42 serve to grip the nail at a predetermined position along its length thereby holding the head 46 of the nail in engagement with the concave face 24 at the leading end 26 of the shank 12. The concave face 24, of course, inhibits lateral movement of the head 46 so as to maintain desired axial alignment of the nail 28 with the shank 12 whereby the nail can be easily driven into a surface by imparting repetitive blows with a driving tool to the flattened head 18 at the trailing end 20 of the shank. The concave face 24 may have a centrally located substantially hemispherical indentation 48 therein, FIGS. 2, 5 and 6, to positively prevent lateral movement of small nail heads such as on finishing nails or the like.

In one preferred form of the present invention, the forward extension 14 is tightly fitted onto the leading end 26 of the shank 12 and bonded thereto with a suitable adhesive so that the leading end 32 of the extension is spaced from the leading end 26 of the shank by approximately three thirty-seconds of an inch whereby the head of most nails will fit between the leading end 26 of the shank and the leading end 32 of the extension portion. The shank portion 12 of the device in one preferred form, is approximately 3 inches long by three-eighths inch in diameter and the overall length of the extension portion 14 is three-fourths inch. A wall thickness of one-sixteenth inch on an extension portion 14 made of a rubber-like material has been found to give the resiliency and flexibility characteristics desired for proper insertion, retention and release of the nail head 46.

Although the present invention has been described with a certain degree of particularity, it is understood that the present disclosure has been made by way of example and that changes in details of structure may be made without departing from the spirit thereof.

What is claimed is:

1. A holder for releasably retaining fasteners during driving operations comprising:
   a tool engaging portion with leading and trailing ends, and
   a fastener-head receiving member secured to the leading end of the tool engaging portion, said receiving member including a sleeve in surrounding relation to said tool engaging portion and a flexible membrane across the leading end of said sleeve and spaced from the leading end of the tool engaging portion to define a shallow receptacle therein, said flexible membrane provided with at least one slotted portion forming a self-closing opening therethrough dimensioned for insertion of the head of a fastener into engagement with the leading end of the tool engaging portion, said slotted portion located centrally of said membrane and terminating short of the leading end of said sleeve, the resiliency of the receiving member being such as to grip the fastener and yieldingly maintain it in engagement with the leading end of the tool engaging portion.

2. The holder of claim 1 wherein said membrane is convex and has intersecting slotted portions defining flexible flaps in said membrane to allow the head of a fastener to be inserted through the opening and into engagement with the leading end of the tool engaging portion.

3. The holder of claim 1 wherein the leading end of the tool engaging portion is concave defining a seat for the head of the fastener.

4. The holder of claim 3 wherein the concave leading end of the tool engaging portion has a centrally located indentation for receiving small sized fastener heads.

5. The holder of claim 1 wherein said sleeve tightly surrounds the leading end of the tool engaging portion.

6. The holder of claim 5 wherein said receiving member is made of a rubber-like material.

7. The holder of claim 6 wherein said tool engaging portion is made of a hardened steel material.

8. A holder for releasably retaining nails and the like during nail-driving operations comprising:
   an elongated cylindrical shank of hardened steel having a trailing end adapted to be contacted with a driving tool and a leading end adapted to seat the head of a nail, said leading end having a forwardly directed concave face with a centrally located indentation in the concave face, and a knurled intermediate portion to facilitate gripping of the holder, and
   an axial extension sleeve member of a rubber-like material bonded to and circumscribing the leading end of the shank, a resilient retainer portion extending across the leading end of said extension sleeve member axially spaced from the concave leading end of the shank and having intersecting slotted portions forming a self-closing opening in said retainer portion, said slotted portions terminating short of the leading end of said sleeve and defining adjacent circumferentially spaced resilient flap means of limited flexibility to allow the head of a nail to be inserted through the opening and into engagement with the leading end of the shank whereby the head is releasably retained by the resilient flaps in the axial space between the retainer portion and the leading end of said shank.

* * * * *